J. ATKINS.
RAKE FOR GRAIN HARVESTER.
No. 282. Reissued Oct. 31, 1854.
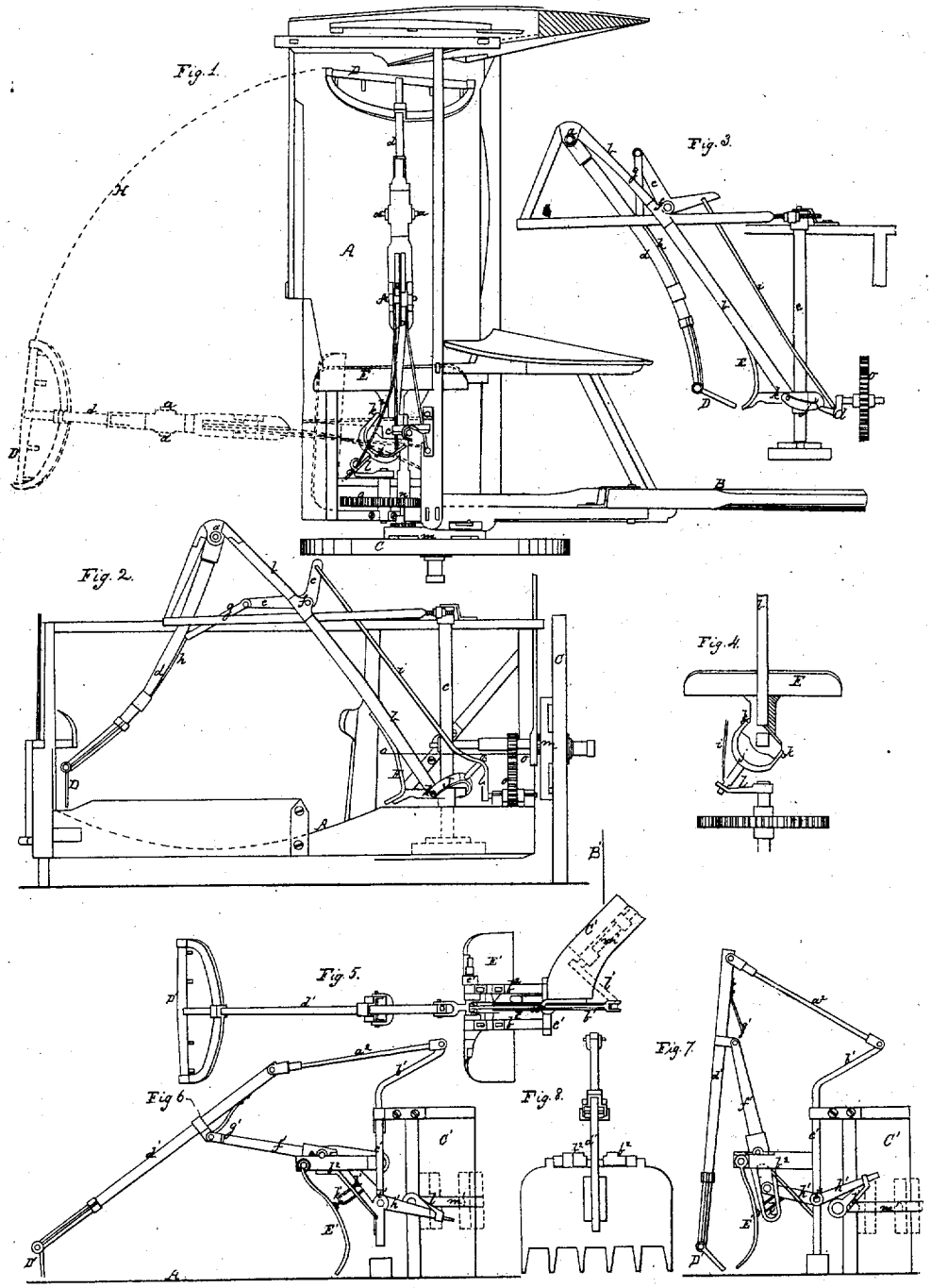
THE NORRIS PETERS CO., PHOTO-LITHO., WASHINGTON, D. C.

UNITED STATES PATENT OFFICE.

JEARUM ATKINS, OF CHELSEA, ILLINOIS.

IMPROVEMENT IN RAKES TO GRAIN-HARVESTERS.

Specification forming part of Letters Patent No. 9,479, dated December 21, 1852; Reissue No. 282, dated October 31, 1854.

*To all whom it may concern:*

Be it known that I, JEARUM ATKINS, of Chelsea, in the county of Will and State of Illinois, have invented a certain new and useful Improvement in Harvesting-Machines or Reapers; and I do hereby declare that the following is a full, clear, and exact description of the same, reference being had to the accompanying drawings, forming part of this specification, in which—

Figure 1 is a plan of a harvesting-machine, in part, with the rake and the mechanical devices for operating attached, the rake being represented in black lines as collecting the grain on the platform and in red lines as delivering the gavel at the back of the machine. Fig. 2 is an elevation, viewed from the rear, showing the rake and its parts as situated in black lines, Fig. 1. Fig. 3 is a similar view, showing mainly the rake and its immediate appurtenances only, the rake being represented as in the act of compressing the grain into a gavel previous to swinging to the position shown in red lines, Fig. 1, for delivery in the rear. Fig. 4 is a detached plan, taken through the line 0 0, Fig. 2, of the swivel, chiefly showing its attachment to the crane and operating-crank 2. Figs. 5, 6, 7, and 8 are views showing a modification of the rake, or different means employed for operating it, Fig. 5 being a plan of the rake occupying the same position as that in Fig. 1 in black lines. Fig. 6 is an elevation from the rear (similar to Fig. 2) exhibiting the modified rake as commencing to collect the grain on the platform; Fig. 7, a like view, but showing the same rake in the act of compressing the grain, as illustrated in Fig. 3 for the first-referred-to rake. Fig. 8 is an elevation at a right angle to Fig. 6, showing the modified rake and its hand as opening for delivery of the gavel that is in the position represented by red lines in Fig. 1.

The nature of my invention consists in so hanging and operating the rake as that it travels across the platform at a right angle to the draft for collecting and compressing the grain against a palm or hand, which, together with the rake, clutches the gavel so formed and, swinging partly around, delivers it in the rear of the machine.

To enable others skilled in the art to make and use my invention, I will proceed fully to describe it.

The first part of the following description has reference to the rake and its appurtenances. (Exhibited in Figs. 1, 2, 3, and 4.)

A is the platform of an ordinary harvesting-machine. Its upper surface is of concave form to correspond with the motion of the rake across it.

B is the tongue or draft-bar to which the cattle are yoked, and C is the bearing driving-wheel that by its resistance in or against the ground as the machine travels forward gives motion to the cutter in front of the platform for mowing the grain, and to the rake D for collecting and delivering it (the grain) as it is deposited on the platform. The rake-handle *a* is suspended at the joint *a* to a jib, *b*, of a crane, of which *c* is the post that swings or turns at the proper interval, it working in bearings above and below in the frame of the machine near the line of draft. Near the foot of the jib *b* and attached to it is a palm or hand, E, which is a board or plate of suitable depth and width extending across the inner end of the platform when the rake is situated as shown in black lines.

*e* is a bell-crank, having its bearing *f* in the jib and connected at its one arm by a rod, *g*, to the rake-handle by a spring, *h*, which performs the same office as if the rake-handle were slightly flexible, to allow of yield when compressing the grain into a gavel. The other arm of the bell-crank *e* is attached by a rod, *i*, to a swivel, *j*, which is hung at one end on pivots *k k*, Fig. 4, to a cross-brace of the post *c*, and connected at its other extremity to a crank, *l*, to which (when the said crank lies horizontal) the swivel, as hung to the post *c*, is situated at an angle of about forty-five degrees. The crank *l* revolves and derives its motion through the driving-wheel C by means of a ring, *m*, affixed to the wheel C, and having teeth on its inner circumference, which mesh into a pinion on the same shaft as in the pinion *n*, that gears into a wheel, *o*, on the shaft or spindle of the crank *l*. The rake thus attached and operated will, in starting from the off side of the machine nearest the standing grain, describe a sweep from the joint *a* across the platform direct toward the line of draft, the crane motion of the rake being dormant during such travel by reason of the relative situation of the swivel $j$ to the crank $l$, which latter at this period of the rake's motion merely gives a vibratory movement to the swivel $j$, so as to operate the bell-crank $e$, that draws in or closes the rake, thereby gathering and compressing the grain into a gavel which is tightly held by the rake and hand E, some little play being allowed in the several parts to prevent the crank $l$, when the rake is performing its collecting part of the travel, from giving the crane motion to the rake—that is, turning the post $c$—but when the grain is thus held collected and pressed the crank $l$, by its continued movement, and while passing its lowest point of travel, operates by the angle it proceeds to describe with the swivel upon the post $c$ to turn it for about the quarter of a circle. The rake and hand thus swinging carry the collected grain in between them, such being the exclusive action of the crank as regards its effect upon the rake, till the post is so turned and the jib situated in rear of the machine, as represented by red lines in Fig. 1, when by the crank $l$ further continuing to revolve the bell-crank $e$ is again acted upon, so as to throw out the rake from the hand E and deliver the gavel or collected grain on the ground in rear of the machine. This being done, the crank $l$, by its continued motion, and while passing its highest point of travel, swings back the rake to the off side of the platform (the rake during this travel being kept extended) for a repetition of the action described. The crank $l$, by its swivel-connection, as shown and specified, thus for two alternate quarters of the circle it describes operates exclusively the bell-crank $j$, and alternately for the other two quarters of its circle gives exclusively the crane motion—that is, simply turns the post $c$, composing for the combined travels of the rake the figure represented by the dotted lines H in Fig. 1.

Figs. 5, 6, 7, and 8 of the drawings refer to a modification of the before-described improvement, and exhibit a rake which, as regards its travel or motion, is mainly similar to that already described, excepting that the palm or hand has at proper intervals a slight vibratory movement communicated to it independently of its motion with the crane-post. In the above figures the rake and its gear, as connected with the platform of the harvesting-machine exclusively, is shown, A′ being the platform. Its upper surface is shown straight, but may be of slightly-convex form to correspond with the travel across of the rake. B′ is a line indicating the direction and situation of the tongue or draft-bar. C′ is a vertical frame or post erected on the platform. D′ is the rake. Its handle $d'$ is jointed at its upper extremity by a rod, $a^2$, to a jib, $b'$, of a crane, of which $c'$ is the post. E′ is the palm or hand. It is provided with teeth on its lower edge, and is suspended to a second jib, $b^2$, attached to the crane-post. It has an inclination given it to press outward from the post by means of a spring, $e'$. $f'$ is a swinging beam hung by trunnions on the jib $b^2$, and jointed at its outer extremity to the rake-handle $d'$, with which it connects at a suitable distance from the top. A spring, $g'$, is attached to the rake-handle. It presses on the swinging beam $f'$ when the rake is being thrown out to its greatest stretch, and serves to start the handle $d'$ from the straight line which the rod $a^2$ forms with it when the rake is fully extended. The inner end of the swinging beam $f'$ is made with a slot in it, in which works a roller running on a wrist of one arm of a crank-lever, $h'$, that is fast to a horizontal spindle or shaft, $i'$, having its bearings in the crane-post. The other arm of the crank-lever $h'$, forming an obtuse angle with the first arm, has a round extremity fitting loosely into a bent lip of a revolving crank, $l'$, whose shaft $m'$, turning in the post $c'$, lies at an angle of about forty-five degrees to a center line intersecting the crane and rake, when situated as in Fig. 6, or at about the same angle to the line of draft B′. A link, $k'$, is hooked to the back of the palm or hand E′, and to a stud projecting midway or thereabouts from the side of the lever $h'$. Motion is communicated to the shaft $m'$ by any suitable gearing from the bearing and propelling wheel of the machine. The crank $l'$ in revolving produces a similar motion upon the rake as in that described in Figs. 1, 2, 3, and 4, excepting that the rake travels nearly in a straight line across the platform, and, as before observed, the palm or hand has a slight movement given it at intervals, which is to open or work inward when delivering the grain, and to close or work outward when collecting it, for the purpose of collecting or scraping up any scattered grain left on the platform by the previous collectors, and assisting or relieving the delivery of the gavel.

The operation of the several mechanical devices described in Figs. 5, 6, 7, and 8 for working this latter modified rake, as compared with the rake first described, is as follows: The levers $h'$ $j'$ and spindle $i'$ form the swivel, which the crank $l'$ alternately operates to swing or turn the crane for the two quarters of a circle it describes—that is, when the crank is passing the highest and lowest points—and swivels the shaft $i'$ in its bearings for the other two alternate quarters of the circle it describes. The shaft $i'$, in swiveling, causes the roller attached to the lever $h'$ to move in the slot of the inner arm of the swinging beam $f'$, and thereby to swing or vibrate the latter, drawing the rake in when collecting the grain on the platform and throwing it out when delivering the gavel at the rear of the machine, and as situated in Fig. 8. The palm or hand E′, hung, as described, to the jib $b^2$, is also alternately worked in and out or vibrated, as before specified, by means of the link $k'$, connecting it to the lever $h'$, and the spring $e'$, which swings the hand or palm out to meet the rake as it (the rake) travels across the platform in collecting the grain, while the opposite motion of the lever $h'$ swings the palm or hand slightly in or back to deliver the gavel when the rake is being extended in the rear. The spring $e'$ also serves to allow of the palm or hand slightly yielding when the grain is being compressed between the palm and the rake in the act of collecting.

This completes the description of my improvement. There are minor details connected therewith which need no prolonged reference—such as the motion given to the rake is quickest and most powerful at those points where such differences are best felt. The rake, it will be seen from reference to the drawings, having the greatest leverage-power exerted upon it when compressing the grain against the palm or hand, different velocities to the operating-crank $l$ or $l'$ may be communicated by suitable gearing, so as to accommodate the action of the rake (in forming a gavel) relatively with the travel (forward) of the machine, as the grain being gathered is light or heavy, thick or thin. The delivery of the gavels in the rear instead of at the side, as is common to machines at present in general use, obviates dragging and scattering of the gavel when delivered lengthwise with the line of draft, as liable to be produced by the forward motion of the machine, and delivery in the rear is in other respects superior to the side, the gavel, when dropping, being clear of all interruption or interference by the machine in progess.

Having thus described my invention, I desire to state that I do not confine myself to the exact mechanical devices and arrangements shown and described for operating the rake, as these may be modified or others substituted for them.

What I claim as my invention, and desire to secure by Letters Patent, is—

1. The means herein described of transmitting motion from the driving-wheel to the raking apparatus, substantially as set forth.

2. The collecting, grasping, and depositing of the cut product by means of a rake and palm, substantially such as described herein.

In testimony whereof I have hereunto signed my name before two subscribing witnesses.

JEARUM ATKINS.

Witnesses:
J. A. HOISINGTON,
GEO. SCOVILLE.